US012656288B2

(12) United States Patent
Li et al.

(10) Patent No.: US 12,656,288 B2
(45) Date of Patent: Jun. 16, 2026

(54) ELECTROCHEMICAL SENSING INTELLIGENT CHAMBER WITH INTEGRATED ENVIRONMENTAL PARAMETERS

(71) Applicant: TianJin University, Tianjin (CN)

(72) Inventors: Shuang Li, Tianjin (CN); Jie Fu, Tianjin (CN); Yongchang Bai, Tianjin (CN); Dong Ming, Tianjin (CN)

(73) Assignee: TianJin University, Tianjin (CN)

( * ) Notice: Subject to any disclaimer, the term of this patent is extended or adjusted under 35 U.S.C. 154(b) by 198 days.

(21) Appl. No.: 18/448,984

(22) Filed: Aug. 14, 2023

(65) Prior Publication Data

US 2024/0068975 A1 Feb. 29, 2024

Related U.S. Application Data

(63) Continuation of application No. PCT/CN2023/100090, filed on Jun. 14, 2023.

(30) Foreign Application Priority Data

Aug. 24, 2022 (CN) .......................... 202211015596.3

(51) Int. Cl.
*G01N 27/27* (2006.01)
*G01D 21/02* (2006.01)
(Continued)

(52) U.S. Cl.
CPC ............. *G01N 27/27* (2013.01); *G01D 21/02* (2013.01); *G01N 35/04* (2013.01); *G01N 35/10* (2013.01)

(58) Field of Classification Search
CPC ................. G01N 27/27; G01N 27/283; G01N 2035/00356; G01N 35/04; G01N 35/10;
(Continued)

(56) References Cited

U.S. PATENT DOCUMENTS 5,420,408 A * 5/1995 Weyrauch ............ G01N 35/025
235/454
2003/0042149 A1* 3/2003 Smith .................... G01N 33/18
205/775
(Continued)

FOREIGN PATENT DOCUMENTS

CN 104777093 A * 7/2015
CN 106896046 A * 6/2017 ............. G01N 15/08
(Continued)

OTHER PUBLICATIONS

Bai et al., English translation of CN113218857A, 2021 (Year: 2021).*

(Continued)

*Primary Examiner* — Shizhi Qian
(74) *Attorney, Agent, or Firm* — Hawaii Patent Services; Nathaniel K. Fedde; Kenton N. Fedde

(57) ABSTRACT

The present invention relates to an electrochemical sensing intelligent chamber with integrated environmental parameters, comprising a chamber body of the intelligent chamber for electrochemical sensing and detection. A communication control unit, a temperature monitoring unit, a gas detection unit and an electrochemical sensing and detection unit are arranged in the chamber body. An environmental parameter monitoring unit that can monitor temperature and gas is integrated; and all monitored environmental variables may be uploaded to a smart phone for a user to view. Operation steps in the electrochemical sensor measurement process conducted in the chamber body are fully automated.

3 Claims, 8 Drawing Sheets

(51) Int. Cl.
G01N 35/04      (2006.01)
G01N 35/10      (2006.01)

(58) Field of Classification Search
CPC ... G01N 33/0016; G01N 33/004; G01D 21/02
See application file for complete search history.

(56) References Cited

U.S. PATENT DOCUMENTS

| | | | | |
|---|---|---|---|---|
| 2006/0129084 A1* | 6/2006 | Miyato | .............. | G01N 35/1016 |
| | | | | 604/19 |
| 2012/0321515 A1* | 12/2012 | Kanayama | ............. | G01N 35/10 |
| | | | | 422/67 |
| 2012/0330596 A1* | 12/2012 | Kouznetsov | ....... | G01N 33/0006 |
| | | | | 73/1.06 |
| 2022/0085436 A1* | 3/2022 | Engle | ................... | H01M 10/48 |
| 2023/0088751 A1* | 3/2023 | Kondaji | ................. | G01N 21/78 |
| | | | | 422/82.05 |
| 2023/0194471 A1* | 6/2023 | Pansodtee | ............. | G01N 27/48 |
| | | | | 204/406 |

FOREIGN PATENT DOCUMENTS

| | | | | | |
|---|---|---|---|---|---|
| CN | 210514065 U | * | 5/2020 | | |
| CN | 112999470 A | * | 6/2021 | ............. | A61M 5/20 |
| CN | 113218857 A | * | 8/2021 | | |

OTHER PUBLICATIONS

Carvalho, Portable open-source autosampler for shallow waters, HardwareX, Aug. 2020, e00142 (Year: 2020).*

Meng et al., English translation of CN106896046A, 2017 (Year: 2017).*

Cao, English translation of CN112999470A, 2021 (Year: 2021).*

* cited by examiner

ELECTROCHEMICAL SENSING INTELLIGENT CHAMBER WITH INTEGRATED ENVIRONMENTAL PARAMETERS

TECHNICAL FIELD

The present invention belongs to the technical field of improvement of electrochemical sensing laboratory modules, and particularly relates to an electrochemical sensing intelligent chamber with integrated environmental parameters.

BACKGROUND

An electrochemical detection technology is spread throughout many fields of modern analytical science and has become one of the main and commonly used sensor detection methods. For example, this technology is widely used in the analytical detection fields of environmental monitoring, medical diagnosis and food supervision. Compared with other detection technologies, the electrochemical detection technology can convert biological data into electrical signals easy to process, has the characteristics of high sensitivity, low cost and miniaturization, and thus has broad application prospects. However, an electrochemical sensing and detection system used in general laboratories is expensive, unportable and cumbersome in operation steps.

In addition, when an electrochemical sensor is researched, the modification of sensor electrodes is often emphasized, but the influence of external environmental factors on a measurement process is ignored. In fact, the temperature will affect the pH value of a measured solution or directly affect the activity of an electrode surface modifier, thereby changing the sensitivity of the sensor electrodes. In the strict measurement process, the external environmental factors shall not be ignored.

SUMMARY

The purpose of the present invention is to overcome the defects in the prior art to provide an electrochemical sensing intelligent chamber with integrated environmental parameters, in which a program control end, a communication control unit, a temperature monitoring unit, a gas detection unit and an electrochemical sensing and detection unit are arranged in a chamber body, the program control end can communicate with the communication control unit, the temperature monitoring unit can automatically adjust the temperature in the chamber body under the control of the communication control unit after the program control end sets the temperature in the chamber body, the gas detection unit can transmit CO2 concentration in the chamber body to the communication control unit and transmit from the communication control unit to the program control end, the communication control unit can receive operation instructions of the program control end and transmit the operation instructions to the electrochemical sensing and detection unit, and the electrochemical sensing and detection unit completes electrochemical detection, realizes remote control of the program control end and automatically completes the electrochemical detection process.

The present invention has the following technical solution:

An intelligent chamber for electrochemical sensing and detection comprises a chamber body; a communication control unit, a temperature monitoring unit, a gas detection unit and an electrochemical sensing and detection unit are arranged in the chamber body; the communication control unit can communicate with the program control end; the temperature monitoring unit can automatically adjust the temperature in the chamber body; the gas detection unit can detect carbon dioxide concentration in the chamber body and transmit to the program control end through the communication control unit; and the electrochemical sensing and detection unit can automatically complete an electrochemical detection process under the control of the communication control unit.

Wherein the electrochemical sensing and detection unit comprises a pipette module, a reagent bottle conveying module and a sensor carrying module; the pipette module comprises a mechanical arm; a syringe is arranged on the mechanical arm; the reagent bottle conveying module comprises an indexing plate for carrying a reagent bottle and a rotating driving component for driving the indexing plate to rotate; the sensor carrying module comprises a grooved container; and an electrode holder is arranged above the grooved container.

Wherein the mechanical arm comprises a transverse component and a lifting component; the lifting component is provided with a syringe; a piston that can rise and fall is arranged in the syringe; a piston driving motor and a laser range finder are arranged beside the syringe; the laser range finder is connected with the syringe; the piston driving motor can drive the piston and a reflecting plate connected with the piston to rise and fall; and the laser range finder and the reflecting plate can work collaboratively to measure the position and the movement distance of the piston in the syringe.

Wherein the reagent bottle conveying module comprises the indexing plate, a tray and a rotating driving component; the lower part of the indexing plate is concentric with the indexing plate and is provided with the tray at an interval; the rotating driving component is arranged below the tray; and the rotating component can drive the indexing plate and the tray to rotate concentrically.

Wherein a suction head storage tank, an ultra-pure water storage tank and a waste liquid storage tank are arranged successively in the grooved container of the sensor carrying module; a suction head remover is arranged above the suction head storage tank near one end of the grooved container; and the electrode holder is arranged above the waste liquid storage tank near the other end of the grooved container.

Wherein the transverse component comprises a transverse track; a lifting component that can move transversely along the transverse track is arranged on the transverse track; a transverse driving motor is arranged on one side of the transverse track; the transverse driving motor can drive a transverse lead screw penetrated at the lower end of the lifting component to rotate so that the lifting component moves transversely along the transverse track; the lifting component comprises a vertical slipway; the slipway is provided with a sliding block that can move vertically along the slipway; the upper end of the slipway is provided with a lifting driving motor; and the lifting driving motor can drive a lifting lead screw penetrated in the sliding block to rotate so that the sliding block moves vertically along the slipway.

Wherein the syringe is fixedly connected to the sliding block; the piston of the syringe extends above the sliding block; the sliding block is provided with a piston driving motor; the piston driving motor can drive a piston driving lead screw connected with the upper end of the piston to rotate so that the piston rises and falls in the syringe to absorb or extrude the liquid in the syringe; a laser range finder is arranged beside the sliding block; a reflecting plate is arranged beside the upper end of the piston which is aligned with the laser range finder; and the reflecting plate can cooperate with the laser range finder to measure the position and movement distance of the piston in the syringe.

Wherein a plurality of reagent storage stations are arranged evenly at intervals on the indexing plate; a suction head storage station is arranged between every two adjacent reagent storage stations; each suction head storage station has the same distance from two adjacent reagent storage stations at a side; a plurality of slits are arranged evenly at intervals on the outer edge of the tray; the number of the slits is equal to the sum of the number of the reagent storage stations and the number of the suction head storage stations; a grooved photoelectric switch is arranged on the side of the tray and corresponding to the slits; and the grooved photoelectric switch can calculate the rotation angle of the indexing plate by recognizing the number of skimmed slits.

Wherein a deflection driving motor is arranged at the side of the electrode holder; the deflection driving motor is connected with the electrode holder through a rotating shaft; the deflection driving motor can drive the electrode holder to deflect by a certain angle through the rotating shaft; a glass tube is arranged above the electrode holder; a dry airflow is introduced into the glass tube; and an air outlet of the glass tube is aligned with an electrode held by the electrode holder so that the dry airflow blown out of the glass tube can air-dry the electrode.

Wherein a bedplate is arranged in the chamber body; the transverse track is arranged at the rear end of the upper end surface of the bedplate; the tray is arranged above the upper end surface of the front bedplate at one side of the transverse track; the rotating driving component is arranged on the bedplate below the tray; the grooved container is arranged on the upper end surface of the front bedplate at the other side of the transverse track; a gas detection unit is arranged on the upper end surface of the bedplate at the front end of the grooved container; the temperature monitoring unit is arranged on the bedplate at the other side of the grooved container; and the temperature monitoring unit comprises two cooling fins respectively arranged on the upper end surface and the lower end surface of the bedplate correspondingly and a semiconductor chilling plate located between the two cooling fins.

An intelligent control system for electrochemical sensing and detection comprises a program control end; the program control end can communicate with the above communication control unit; after a user sets the temperature in the chamber body at the program control end, the program control end issues an instruction to the communication control unit and controls the temperature monitoring unit to adjust the temperature in the chamber body; the program control end can receive the carbon dioxide concentration in the chamber body transmitted to the communication control unit by the gas detection unit; and when the user selects and starts an electrochemical test at the program control end, the program control end can issue an instruction to the communication control unit and control the electrochemical sensing and detection unit to automatically complete the electrochemical detection process.

The present invention has the advantages and positive effects that:

In the present invention, an electrochemical detection unit is arranged in a sealed chamber body; an environmental parameter monitoring unit comprising monitoring temperature and monitoring gas is integrated in the chamber body; and all monitored environmental variables may be uploaded to a smart phone for the user to view, so as to facilitate subsequent standardization of the environmental variables. The temperature monitoring unit combines the semiconductor chilling plate with an H bridge driving module with adjustable output voltage size and polarity to form a closed-loop negative feedback temperature control system. The semiconductor chilling plate can be cooled or heated on one side under fixed conditions, and the cooling or heating speed can be adjusted to prevent a circuit from burning out due to excessive circuit current when an initial deviation is too large and also avoid large temperature oscillation in the chamber body. A series of operation steps required in the electrochemical sensor measurement process in the chamber body are fully automated, thereby greatly improving the detection efficiency of personnel. A stepping motor is used as a motion actuator in the electrochemical detection unit. The precise and controllable motion of the stepping motor greatly reduces the possibility of errors in the electrochemical detection unit. The precise motion of the syringe piston driven by a lead screw stepping motor is matched with the laser range finder to judge the position of the piston, thereby avoiding measurement errors caused by that a target analyte solution enters the syringe. A plurality of stations are arranged on the indexing plate, which can load 12 reagent bottles and 12 suction heads at one time, thereby avoiding the cumbersome steps of "measuring once and loading once" and especially being suitable for the detection of reagents of the same type and different concentrations. Electrochemical sensing and detection in the sealed chamber body requires less operating conditions, and is simple in operation, good in operating stability, strong in universality and easy to popularize and use.

DETAILED DESCRIPTION

The present invention is further illustrated below in combination with embodiments. The following embodiments are illustrative, not restrictive, and shall be not used for limiting the protection range of the present invention.

The present invention provides an electrochemical sensing intelligent chamber with integrated environmental parameters, comprising an intelligent chamber for electrochemical sensing and detection capable of controlling environmental parameters and an intelligent control system for electrochemical sensing and detection capable of communicating with the intelligent chamber.

Figure 1:
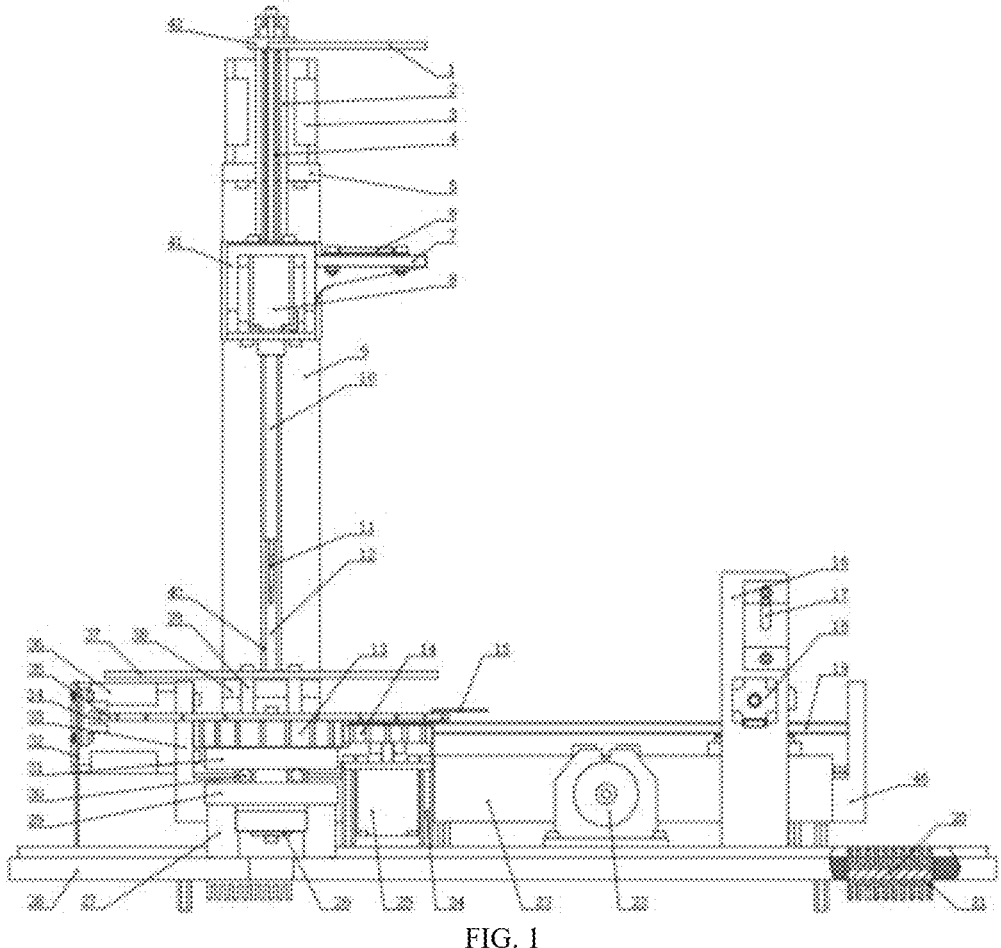
FIG. 1 is a structural schematic diagram of the present invention.
Figure 2:
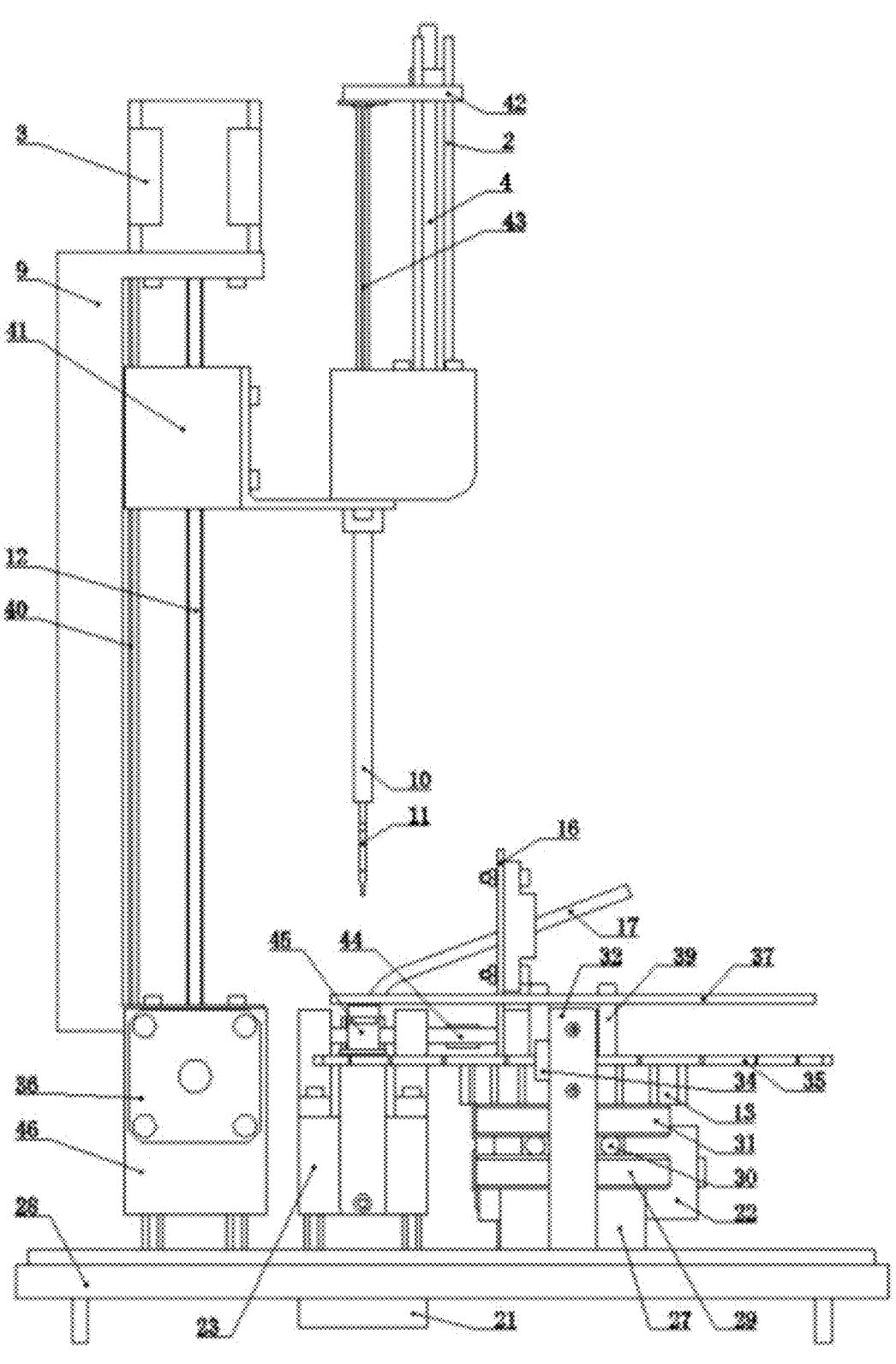
FIG. 2 is a left view of FIG. 1.
Figure 3:
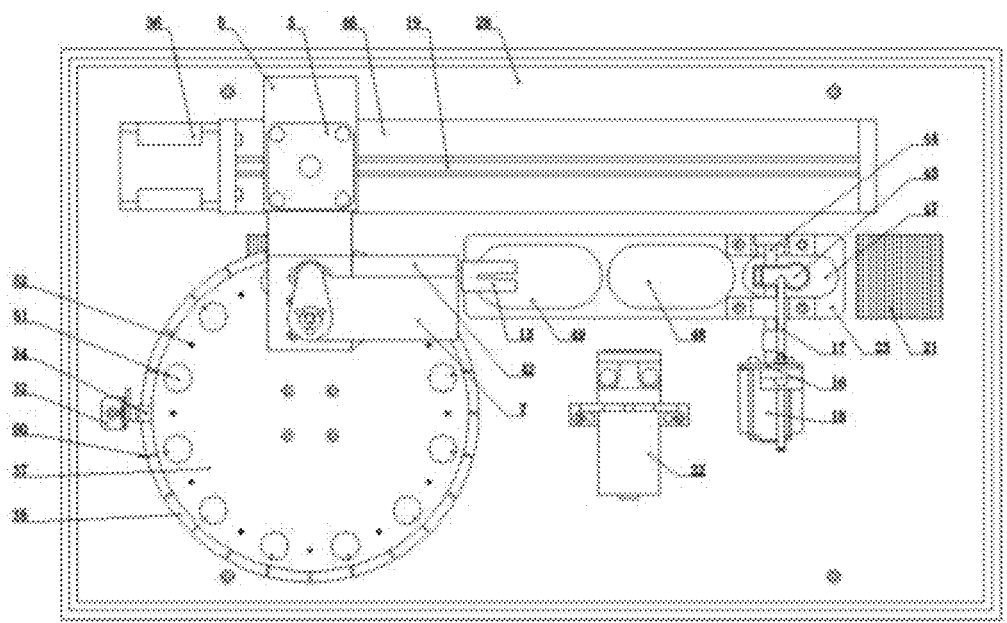
FIG. 3 is a top view of FIG. 1.

An intelligent chamber for electrochemical sensing and detection is shown in FIGS. 1, 2 and 3. The innovation of the present invention is: the intelligent chamber comprises a chamber body which can be sealed; a communication control unit, a temperature monitoring unit, a gas detection unit and an electrochemical sensing and detection unit are arranged in the chamber body; the communication control unit can communicate with a program control end; the temperature monitoring unit can automatically adjust the temperature in the chamber body; the gas detection unit can detect carbon dioxide concentration in the chamber body and transmit to the program control end through the communication control unit; and the electrochemical sensing and detection unit can automatically complete an electrochemical detection process under the control of the communication control unit.

A bedplate 28 is arranged in the chamber body, and the temperature monitoring unit, the gas detection unit and the electrochemical sensing and detection unit are arranged on the bedplate. The electrochemical sensing and detection unit comprises a pipette module, a reagent bottle conveying module and a sensor carrying module; the pipette module comprises a mechanical arm arranged on the upper end surface of the bedplate; the mechanical arm is a two-degree-of-freedom mechanical arm; a syringe is arranged on the mechanical arm; the mechanical arm can carry the syringe for loading and unloading a suction head and drawing and adding reagents; the reagent bottle conveying module comprises an indexing plate for carrying a reagent bottle and a rotating driving component for driving the indexing plate to rotate; the sensor carrying module comprises a grooved container; and an electrode holder 45 is arranged above the grooved container 23. The grooved container is used for accommodating the suction head after use and the waste liquid after electrochemical detection, and the electrode holder is used for holding an electrode for electrochemical sensing and detection.

The mechanical arm comprises a transverse component and a lifting component; the transverse component comprises a transverse track 46; and the transverse track 46 is arranged at the rear side on the upper end surface of the bedplate. The transverse track is provided with a vertical lifting component; both ends of the transverse track are provided with baffle plates 33 respectively; and the lifting component can conduct transverse limiting movement between the above baffle plates along the transverse track. A transverse driving motor 36 is arranged on one end of the transverse track; an output shaft of the transverse driving motor is connected with a transverse lead screw 19 arranged above the transverse track; the transverse lead screw is penetrated at the lower end of the lifting component and mutually matched with an internal thread arranged at the lower end of the lifting component or a nut arranged at the lower end of the lifting component; the transverse driving motor drives the transverse lead screw to rotate so as to drive the lifting component to conduct transverse limiting movement along the transverse track; a guide post that is spaced and parallel to the lead screw can be penetrated at the lower end of the lifting component to make the lifting component move smoothly; and other components such as a limiting groove and a limiting block that can make the lifting component move smoothly are also optional. The transverse driving motor can use a stepping motor, so that the transverse movement distance of the lifting component on the transverse track can be accurately controlled.

The lifting component comprises a vertical slipway 9, and the upper and lower ends of the slipway are respectively provided with a top plate 5 and a bottom plate. The bottom plate at the lower end of the slipway is provided with the above transverse lead screw in a penetrating mode or connected with the above nut, and is arranged on the transverse track in a mode of transverse limiting movement. The slipway is provided with a sliding block that can conduct vertical limiting lifting movement along the slipway; the top plate of the slipway is provided with a lifting driving motor 3; an output shaft of the lifting driving motor is connected with a lifting lead screw 12 arranged at the front side of the slipway; the lifting lead screw is penetrated in the sliding block and mutually matched with the internal thread (such as nut) in the sliding block; and it is also possible to install the nut on the sliding block. The lifting driving motor drives the lifting lead screw to rotate so as to drive the sliding block to conduct vertical limiting lifting movement along the slipway. A lifting limiting track 40 is arranged at the front side of the slipway between the slipway and the lifting lead screw, and the lifting limiting track can limit the sliding block so that the sliding block is kept stable when moving vertically. The lifting driving motor can use a stepping motor, so that the vertical movement distance of the sliding block can be accurately controlled.

In the present invention, both the transverse driving motor and the lifting driving motor use a lead screw stepping motor with a step angle of 1.8° and a lead of 1 mm, and the resolution is 0.005 mm. A stroke switch is arranged respectively at the limiting positions of the transverse track and the slipway, which can eliminate cumulative errors, thereby ensuring that the syringe carried by the mechanical arm can carry out a series of operations accurately.

The front end of the sliding block is provided with a connecting plate, the connecting plate is provided with a fixing seat 41, the fixing seat is hollow cubic shape, and a syringe is arranged in the fixing seat. An opening of a barrel 10 of the syringe is upward and located at the upper end of the fixing seat; the lower end of the barrel of the syringe extends to the lower part of the fixing seat; the bottom of the barrel of the syringe is provided with a suction head seat; and the suction head seat can be provided with a suction head 11 for absorbing reagent solution. A piston is arranged in the upward opening of the syringe, and the lifting of the piston in the syringe enables the syringe to absorb or extrude the reagent solution. The piston is connected with the lower end of a piston rod 43; the upper end of the piston rod is connected with a lifting plate 42; the upper end of the fixing seat is provided with a plurality of guide posts 2; and the lifting plate is sleeved on the guide posts and conducts vertical limiting movement along the guide posts.

Three guide posts are arranged in the present embodiment, and the lifting plate conducts vertical limiting movement above the fixing seat through the three guide posts. A piston driving motor 8 is arranged in a fixing seat at the front side of the barrel; an output shaft of the piston driving motor is connected with a piston lead screw 4; the piston lead screw is penetrated in the lifting plate and mutually matched with the internal thread (such as a nut) or the nut in the lifting plate; the piston driving motor drives the piston lead screw to rotate to drive the lifting plate to move vertically; the vertical movement of the lifting plate can drive the piston to rise and fall in the barrel through the piston rod; and the guide posts enable the piston to rise and fall in the barrel more smoothly while limiting the lifting plate. The piston driving motor can use a stepping motor, so that the movement distance of the piston in the barrel can be accurately controlled to control the amount of the reagent solution absorbed by the syringe. In the present invention, the piston driving motor uses the stepping motor.

The other end of the fixing seat is provided with an installing plate 7; the upper end surface of the installing plate is provided with a laser range finder 6; the other end of the lifting plate is provided with a reflecting plate 1 aligned with the laser range finder; the reflecting plate can rise and fall with the lifting plate; the laser range finder and the reflecting plate can work collaboratively to measure the position and the movement distance of the piston in the barrel of the syringe, so as to measure the amount of the reagent solution absorbed or extruded by the syringe.

The reagent bottle conveying module comprises an indexing plate 37, a tray 35 and a rotating driving component; the indexing plate and the tray are arranged above the upper end surface of bedplate at the front side of one end (the left side in FIG. 1) of the transverse track; and a rotating driving component is arranged on the bedplate below the indexing plate and the tray.

The tray is spaced below the indexing plate, and a gasket 38 is arranged between the indexing plate and the tray to maintain a gap therebetween. The lower end surface of the tray is provided with a driven gear 13; the lower end of the driven gear is provided with an upper shaft support 31; a lower shaft support 29 is spaced below the upper shaft support; and the lower shaft support is fixedly arranged on the upper end surface of the bedplate through a fixing foot 27. The indexing plate, the tray, the driven gear, the upper shaft support and the lower shaft support are sleeved on the same rotating shaft 26 successively from top to bottom, and a bearing 30 is arranged between the upper shaft support and the lower shaft support. The lower shaft support is fixed above the bedplate; the upper shaft support can support the driven gear to rotate freely above the lower shaft support under the carrying of the bearing; the driven gear can drive the tray to rotate synchronously; the indexing plate is fixedly arranged above the tray through a plurality of positioning columns 39; and the rotation of the tray can drive the indexing plate to rotate synchronously.

Four positioning columns are arranged in the present embodiment. The rotating driving component comprises a rotating driving motor 25 fixedly arranged on the upper end surface of the bedplate through a motor fixing seat 24. An output shaft of the rotating driving motor is provided with a driving gear 14, and the driving gear is engaged with the driven gear. When the rotating driving motor drives the driving gear to rotate, the driven gear can be driven to rotate, and the driven gear can drive the indexing plate and the tray to rotate synchronously. In the present embodiment, the rotating driving motor adopts a stepping motor (28 series), but a stepping motor with a step angle of 1.8° cannot complete a reagent storage station conversion at 30° per rotation without subdivision. Therefore, a pair of driving gear and driven gear with a transmission ratio of 1.8 is used here for changing a transmission feature as: when the rotating driving motor rotates by one step angle, the indexing plate only rotates by 1°. At this moment, under the condition that the rotating driving motor inputs 30 pulses each time, the indexing plate can complete a reagent storage station conversion.

A plurality of reagent storage stations 51 are arranged at uniform intervals on the indexing plate; and the reagent storage stations are larger round holes. A suction head storage station 52 is arranged between every two adjacent reagent storage stations. The suction head storage station is a smaller round hole. Each suction head storage station has the same distance from two adjacent reagent storage stations at a side. In the present embodiment, 12 reagent storage stations are arranged at uniform intervals on the indexing plate, and each reagent storage station can accommodate one reagent bottle. Accordingly, 12 suction head storage stations are arranged on the indexing plate, and the suction head storage stations and the reagent storage stations are arranged alternately. 24 stations are arranged at equal intervals in a circle. There are two suction head storage stations on the side of each reagent storage station, and there are two reagent storage stations on the side of each suction head storage station. The intervals between the reagent storage stations and the suction head storage stations are the same. The reagent storage stations are orderly arranged on the circle of the indexing plate according to the serial numbers 1-12, which is convenient for users to identify the corresponding reagent bottles to achieve "one loading, 12 measurements", and greatly improves the space utilization rate.

A plurality of slits 50 are arranged evenly at intervals on the outer edge of the tray; the number of the slits is equal to the sum of the number of the reagent storage stations and the number of the suction head storage stations; a grooved photoelectric switch 34 is arranged on the side of the tray and corresponding to the slits; and the grooved photoelectric switch is arranged on the upper end surface of the bedplate through a pillar 32. The grooved photoelectric switch can calculate the rotation angle of the indexing plate by recognizing the number of skimmed slits. In the present embodiment, the number of the slits is 24, and the width of the slits is 1 mm. Each slit corresponds to one reagent storage station or one suction head storage station. The slits and the grooved photoelectric switch are mutually matched to so that each reagent storage station or suction head storage station can be recognized through the slits skimmed by the grooved photoelectric switch during rotation.

The grooved container 23 of the sensor carrying module is arranged on the upper end surface of the bedplate at the front side of the other end of the transverse track. The grooved container is a transverse cuboid, and the upper end surface of the cuboid is provided with a plurality of grooves. In the present embodiment, a suction head storage tank 49, an ultra-pure water storage tank 48 and a waste liquid storage tank 47 are arranged successively on the upper end surface of the grooved container; a suction head remover 15 is arranged above the suction head storage tank near one end of the grooved container; and the electrode holder 45 is arranged above the waste liquid storage tank near the other end of the grooved container. The suction head remover is provided with a V-shaped bayonet with an opening towards the other end of the grooved container. After the suction head is clamped into the V-shaped bayonet, the suction head can be removed from the syringe, and the removed suction head falls into the suction head storage tank. The electrode holder is used for holding a sensor electrode for electrochemical detection.

A rotating shaft seat is arranged on the grooved container located above the waste liquid storage tank. A rotating shaft 44 is perforated in the rotating shaft seat. The rotating shaft is connected with the lower end of the electrode holder, and an electrochemical sensor electrode for electrochemical detection is arranged in the electrode holder. An installing frame 16 is arranged on the upper end surface of the bedplate at the front side of the waste liquid storage tank, and a deflection driving motor 18 is arranged on the installing frame. An output shaft of the deflection driving motor is connected with the rotating shaft, and the deflection driving motor can drive the rotating shaft to rotate by a certain Angle, so as to drive the electrode holder to deflect by a certain Angle. After the electrode holder is deflected, the waste liquid on the electrode and in the electrode holder can be dumped into the waste liquid storage tank below. In the present embodiment, the deflection driving motor uses a stepping motor.

A glass tube 17 is penetrated on the installing frame; a dry airflow is introduced into the glass tube; and an air outlet of the glass tube is located above the electrode holder and aligned with an electrode held by the electrode holder so that the dry airflow blown out of the glass tube can air-dry the electrode.

In order to make each moving component conduct emergency braking when an error occurs during operation, the limit position or target position of each moving component has the corresponding stroke switch or grooved photoelectric switch. The trigger or no trigger of the switches is constantly detected within a given time to judge whether the intelligent chamber has an operation error, so as to determine whether the system performs an emergency braking procedure. An alarm device can be arranged on the chamber body. In case of emergency braking, the alarm device can prompt an operator for emergency power off or manual resetting of the electrochemical detection unit through an alarm lamp and a buzzer.

A gas detection unit is arranged on the upper end surface of the bedplate at the front side of the grooved container, and the gas detection unit comprises a microcontroller and a carbon dioxide concentration sensor 22. The carbon dioxide concentration sensor in the present embodiment adopts an SGP30 metal oxide gas sensor. SGP30 mainly detects the CO2 concentration in a working space and transmits the data to the microcontroller. The microcontroller is connected with the SGP30 metal oxide gas sensor through an IIC bus. The microcontroller converts the original data transmitted back to obtain the actual value of the CO2 concentration and transmit the actual value to a communication control module.

A temperature monitoring unit is arranged on the bedplate at the other side of the grooved container, and the temperature monitoring unit comprises a 12V lithium battery, a microcontroller, a semiconductor chilling plate 20, a voltage regulating module, and a temperature and humidity sensor. In the present embodiment, the temperature and humidity sensor uses an SHT40 digital temperature and humidity sensor. The 12V lithium battery is connected with the voltage regulating module, a PWM signal line of the microcontroller is also connected with the voltage regulating module, the voltage regulating module is connected with the semiconductor chilling plate, and the SHT40 sensor is connected with the microcontroller. The semiconductor chilling plate is embedded in the bedplate at the other side of the grooved container, and two cooling fins 21 are correspondingly arranged on the upper end surface and the lower end surface of the semiconductor chilling plate. The voltage regulating module can output variable voltage from −12V to 12V under the control of a PWM signal of the microcontroller. The user firstly needs to set a target temperature, measure the real temperature and humidity through the SHT40 digital temperature and humidity sensor, and feed the real temperature and humidity back to the microcontroller. After calculating and processing the deviation between the real temperature and the target temperature, the microcontroller outputs the deviation to actuating mechanisms (the semiconductor chilling plate and the voltage regulating module) to control the temperature in the entire intelligent chamber. This deviation may cause the actuating mechanisms to act continuously until the real temperature of the system is near a target temperature value with a small fluctuation.

A communication control unit is also arranged in the chamber body. The communication control unit comprises a microcontroller based on STM32F415RGT6 and a Bluetooth module. After receiving a control instruction, the Bluetooth module transmits the control instruction to the microcontroller. As a control and data processing unit, the microcontroller sends a control signal to each actuating element and receives the data returned by each sensor, so that each moving component in the intelligent chamber is operated coordinately finally. The communication control unit may be arranged on the inner wall of the chamber body or on the bedplate. In the present embodiment, the communication control unit is arranged on the bedplate.

An intelligent control system for electrochemical sensing and detection comprises a program control end; and the program control end can communicate with the above communication control unit in the intelligent chamber for electrochemical sensing and detection.

Because the intelligent chamber for electrochemical sensing and detection is not completely automatic during operation and the loading of reagents and suction heads needs to be carried out manually, a preferred communication mode in the present embodiment is Bluetooth connection and other wireless communication modes such as WIFI or wired communication modes can also be selected according to the actual environment. In the present embodiment, a preferred program control end is operated on a smart phone in the form of a Wechat mini program, which is convenient and fast, and the communication control unit can display the data detected by the electrochemical sensor in the Wechat mini program in real time.

As shown in FIG. 5, the Wechat mini program comprises a communication establishment interface, a parameter setting and control interface, and a drawing and data display interface. The communication establishment interface comprises a switch button of "turning on Bluetooth" and "turning off Bluetooth", and has the function of pull-down to refresh the Bluetooth device. A symbol of Bluetooth signal strength is designed in a display list of the Bluetooth device, which is divided into four strength levels, and a full grid indicates the strongest signal; and after Bluetooth connection, a button of "disconnecting Bluetooth" is displayed, which is convenient for users to use flexibly.

The parameter setting and control interface comprises an input box for numerical display of temperature, humidity and carbon dioxide concentration in the intelligent chamber and manual setting of the target temperature of the intelligent chamber. A selector of an electrochemical test method is arranged below the interface. When the electrochemical test method is selected, it will jump to an electrochemical test parameter setting interface. After the parameter setting is completed, an "OK" button is clicked to exit the interface, and a "START" button is clicked to start the electrochemical test process. After clicking, the data display and drawing interface is automatically entered.

The drawing and data display interface comprises an upper drawing region which displays a curve of the current with respect to the potential; and two regions of a receiving region and a transmitting region, and a relevant button are arranged below. The transmitting region allows the user to manually input command codes and transmit the command codes to a lower machine for testing the device. The receiving region is a data display region. The user can see the specific value of the electrochemical test in real time. Similarly, a "clear data" button is arranged below the data display region, which is convenient for the user to carry out relevant operation.

The program control end can set the temperature in the intelligent chamber. After setting, the program control end issues an instruction to the communication control unit, and the communication control unit controls the temperature monitoring unit to adjust the temperature in the chamber body to a set value. The gas detection unit can transmit the detected carbon dioxide concentration in the chamber body to the communication control unit, and then transmit to the program control end by the communication control unit. The user can view the gas environment in the chamber body at the program control end. The temperature and the gas environment can be used for judging whether electrochemical detection results are accurate, and the error of electrochemical detection can be controlled or adjusted according to the environmental value to make the detection results more accurate.

After the user selects an electrochemical test at the program control end, the user presses the "START" button; then the program control end issues an instruction to the communication control unit, and the program control end controls the electrochemical sensing and detection unit to automatically complete the electrochemical detection process.

Figure 4:
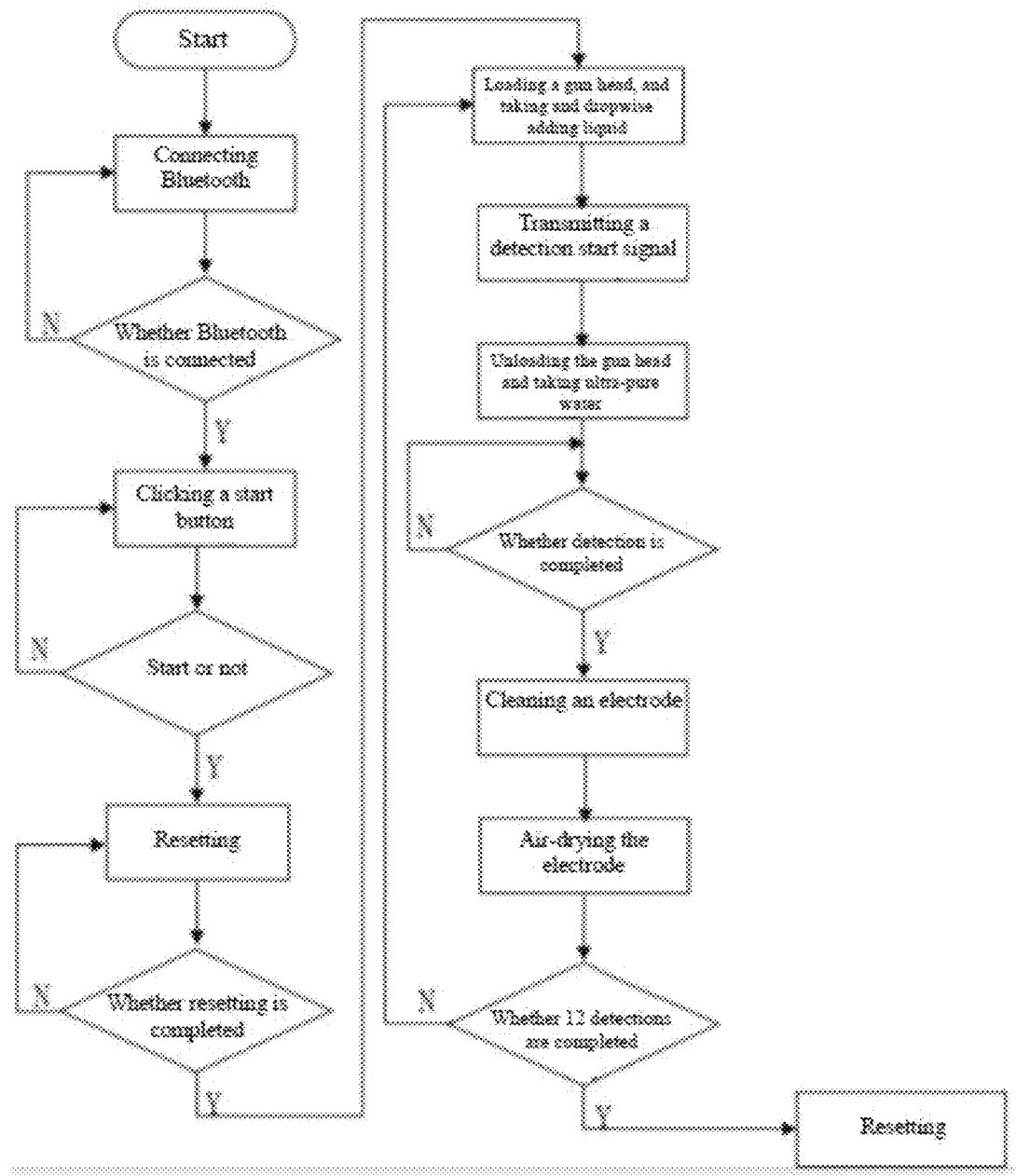
FIG. 4 is a flow chart of electrochemical detection of the present invention.
Figure 5A:
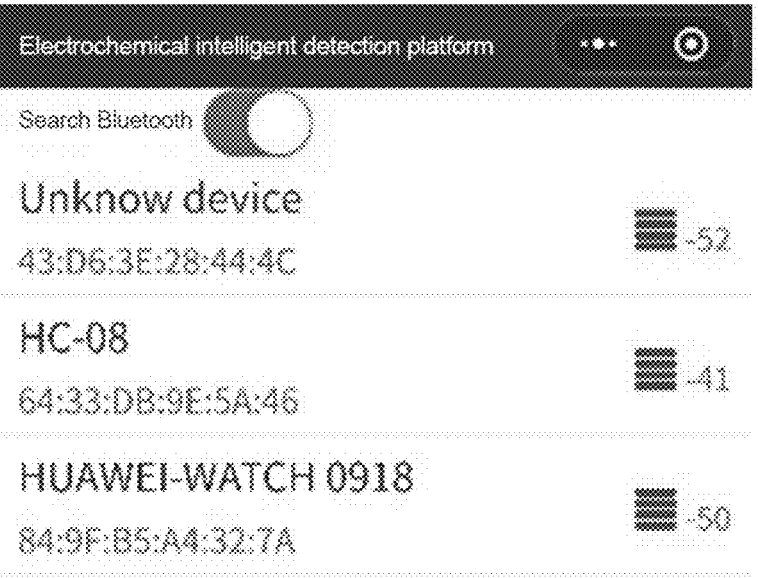
FIG. 5 shows a display operation interface of Wechat mini program of the present invention.
Figure 5A:
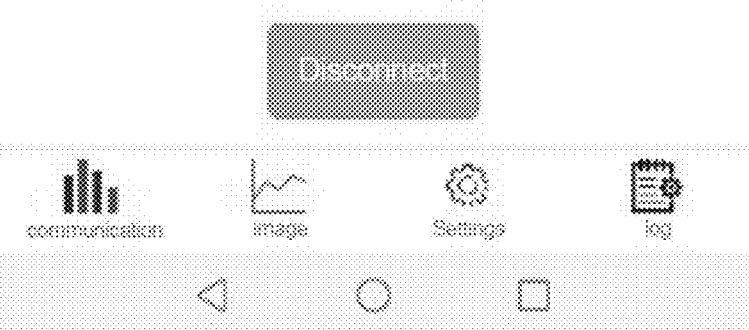
Figure 5B:
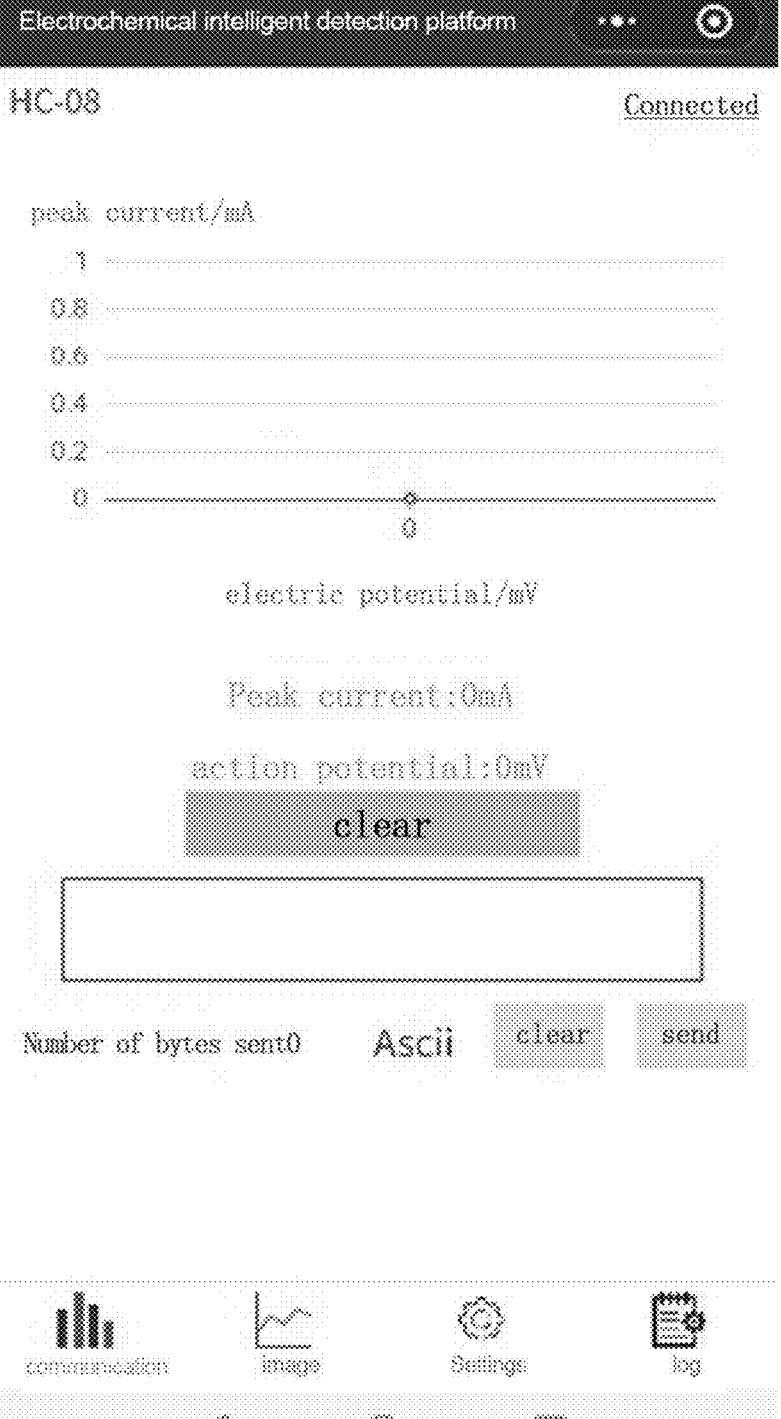
Figure 5C:
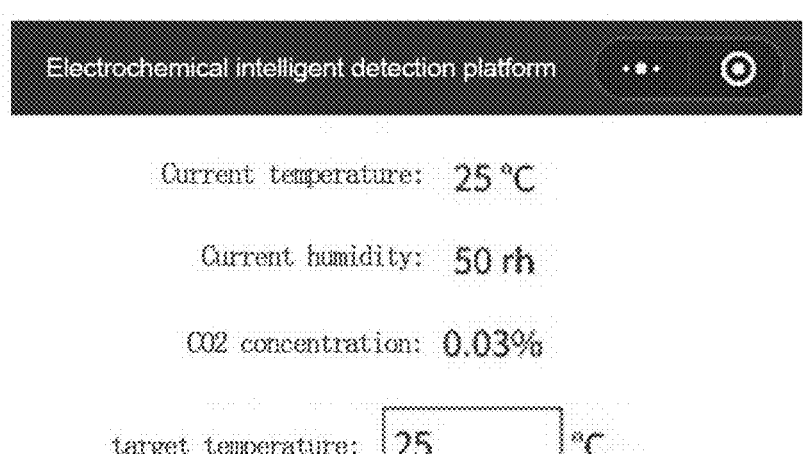
Figure 5C:
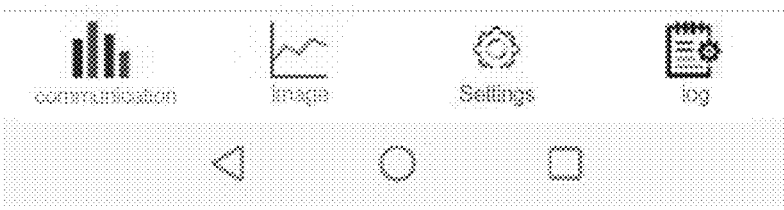
Figure 5D:
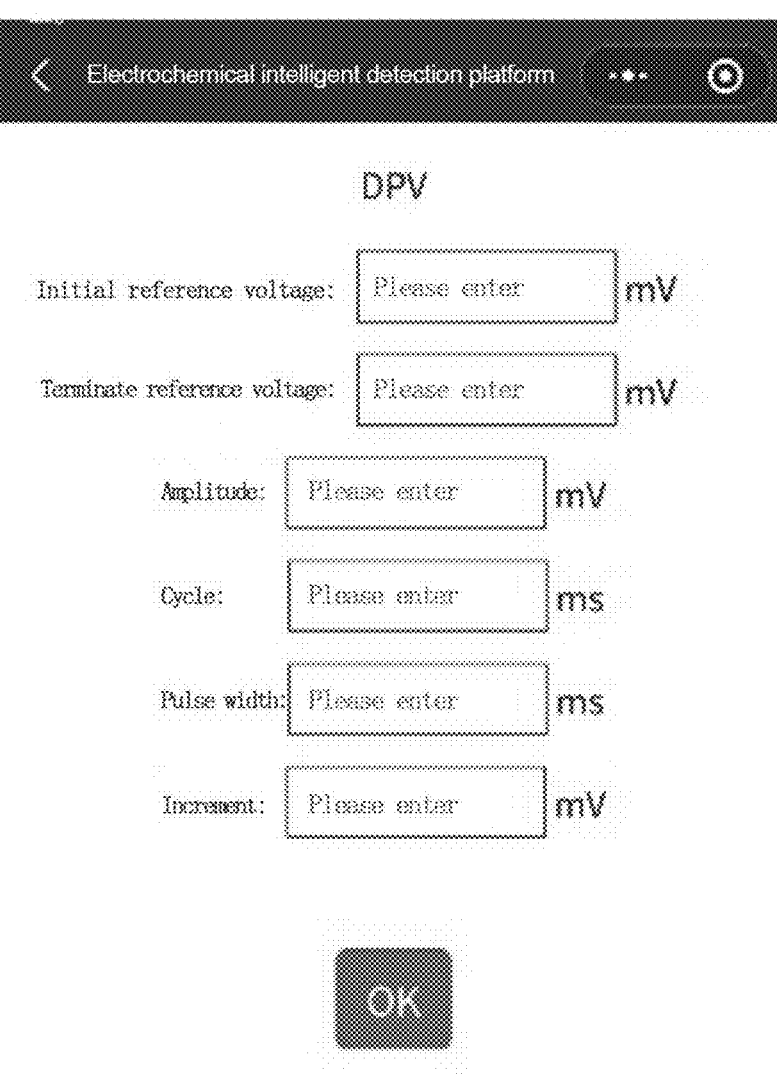
Figure 5D:
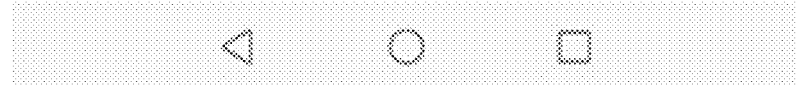

As shown in FIG. 4, the electrochemical detection process in the present invention is:

1. The chamber body is opened, reagent bottles containing pre-configured standard reagents and suction heads are placed in order (reagent bottle—suction head—reagent bottle—suction head) on the indexing plate, and the components in the chamber body are checked for damage or abnormal conditions;
2. The chamber body is closed, Bluetooth connection is established between a smart phone and the intelligent chamber, and the environmental parameters inside the chamber body are viewed through a Wechat mini program;
3. The temperature in the chamber body is set to 25° C. in the Wechat mini program, a selected electrochemical detection method is DPV, and the required parameters of the electrochemical detection method are inputted: a start reference voltage of −0.4V, an end reference voltage of 0.4 V, an increment of 0.005 V, an amplitude of 0.05 V, a pulse width of 0.05 s, and a cycle of 0.5 s;
4. The "START" button is pressed to inspect whether the components of the electrochemical detection unit are reset, and the electrochemical detection process is started after the resetting;
5. The lifting driving motor drives the syringe to fall, the suction head seat at the bottom of the syringe is inserted into the suction head on the indexing plate, and the lifting driving motor drives the syringe to carry the suction head to rise;
6. The rotating driving motor drives the indexing plate to rotate by one station (i.e., the current slit to the next slit), the lifting motor drives the syringe to fall, and the suction head carried by the syringe is inserted into the reagent solution in the reagent bottle;
7. The piston driving motor drives the piston to rise, and the syringe absorbs the reagent solution and judges the amount of the absorbed reagent solution through the laser range finder;
8. The lifting motor drives the syringe to rise, and the transverse driving motor drives the slipway and the syringe to move above the electrode holder;
9. The piston driving motor drives the piston t fall, and the reagent solution in the syringe is completely dripped onto the electrode of the electrochemical sensor held by the electrode holder for electrochemical detection;
10. The transverse driving motor drives the slipway and syringe to move above the suction head remover; the lifting driving motor drives the syringe to fall; after the suction head of the syringe falls and is inserted into the V-shaped bayonet of the suction head remover, the transverse driving motor drives the slipway and the syringe to move to the tip of the V-shaped bayonet so that the suction head is locked by the suction head remover; and the lifting driving motor drives the syringe to rise to separate the suction head from the syringe;

11. The transverse driving motor drives the slipway and the syringe to move above the ultra-pure water storage tank; the lifting driving motor drives the syringe to fall, and the bottom end of the syringe is inserted into the ultra-pure water storage tank; the piston driving motor drives the piston to rise; and the syringe absorbs the ultra-pure water in the ultra-pure water storage tank;
12. The lifting driving motor drives the syringe to rise; the transverse driving motor drives the slipway and the syringe to move above the electrode holder; the piston driving motor drives the piston to fall; and the ultra-pure water in the syringe is dripped onto the electrode to wash the electrode;
13. The deflection driving motor drives the electrode holder to deflect; and after the waste liquid in the electrode holder is discharged, the deflection driving motor drives the electrode holder to reset and the glass tube blows out a dry airflow to air-dry the electrode;
14. The rotating driving motor drives the indexing plate to rotate by one station; the above step 5 to step 13 are repeated until all the reagent bottles on the indexing plate are used; a standby state is entered; and the reagent can be reloaded to continue electrochemical detection, or a power supply can be turned off, and the intelligent chamber is opened and cleaned.

The above process is an electrochemical detection based on DPV method, and is only an example. The electrochemical sensing and detection analysis which integrates detection process automation and data image analysis on the smart phone platform has profound significance. The technology can be applied to the detection process that takes a screen printing electrode as an electrochemical sensor, has the advantages of good device stability and convenient operation, and can adapt to the requirements of most electrochemical sensor detection.

In the present invention, an electrochemical detection unit is arranged in a sealed chamber body; an environmental parameter monitoring unit comprising monitoring temperature and monitoring gas is integrated in the chamber body; and all monitored environmental variables may be uploaded to a smart phone for the user to view, so as to facilitate subsequent standardization of the environmental variables. The temperature monitoring unit combines the semiconductor chilling plate with an H bridge driving module with adjustable output voltage size and polarity to form a closed-loop negative feedback temperature control system. The semiconductor chilling plate can be cooled or heated on one side under fixed conditions, and the cooling or heating speed can be adjusted to prevent a circuit from burning out due to excessive circuit current when an initial deviation is too large and also avoid large temperature oscillation in the chamber body. A series of operation steps required in the electrochemical sensor measurement process in the chamber body are fully automated, thereby greatly improving the detection efficiency of personnel. A stepping motor is used as a motion actuator in the electrochemical detection unit. The precise and controllable motion of the stepping motor greatly reduces the possibility of errors in the electrochemical detection unit. The precise motion of the syringe piston driven by a lead screw stepping motor is matched with the laser range finder to judge the position of the piston, thereby avoiding measurement errors caused by that a target analyte solution enters the syringe. A plurality of stations are arranged on the indexing plate, which can load 12 reagent bottles and 12 suction heads at one time, thereby avoiding the cumbersome steps of "measuring once and loading once" and especially being suitable for the detection of reagents of the same type and different concentrations. Electrochemical sensing and detection in the sealed chamber body requires less operating conditions, and is simple in operation, good in operating stability, strong in universality and easy to popularize and use.

The invention claimed is:

1. An intelligent chamber for electrochemical sensing and detection, comprising a chamber body, wherein a communication control unit, a temperature monitoring unit, a gas detection unit and an electrochemical sensing and detection unit are arranged in the chamber body; the communication control unit can communicate with a program control end; the temperature monitoring unit can automatically adjust a temperature in the chamber body; the gas detection unit can detect carbon dioxide concentration in the chamber body and transmit to the program control end through the communication control unit; and the electrochemical sensing and detection unit can automatically complete an electrochemical detection process under control of the communication control unit;

wherein the electrochemical sensing and detection unit comprises a pipette module, a reagent bottle conveying module and a sensor carrying module; the pipette module comprises a mechanical arm; a syringe is arranged on the mechanical arm; the reagent bottle conveying module comprises an indexing plate for carrying a reagent bottle and a rotating driving component for driving the indexing plate to rotate; the sensor carrying module comprises a grooved container; and an electrode holder is arranged above the grooved container;

wherein the mechanical arm comprises a transverse component and a lifting component; the lifting component is provided with the syringe; a piston that can rise and fall is arranged in the syringe; a piston driving motor and a laser range finder are arranged beside the syringe; the laser range finder is connected with the syringe; the piston driving motor can drive the piston and a reflecting plate connected with the piston to rise and fall; and the laser range finder and the reflecting plate can work collaboratively to measure a position and a movement distance of the piston in the syringe;

wherein the transverse component comprises a transverse track; the lifting component that can move transversely along the transverse track is arranged on the transverse track; a transverse driving motor is arranged on one side of the transverse track; the transverse driving motor can drive a transverse lead screw penetrated at a lower end of the lifting component to rotate so that the lifting component moves transversely along the transverse track; the lifting component comprises a vertical slipway; the vertical slipway is provided with a sliding block that can move vertically along the vertical slipway; an upper end of the vertical slipway is provided with a lifting driving motor; and the lifting driving motor can drive a lifting lead screw penetrated in the sliding block to rotate so that the sliding block moves vertically along the vertical slipway; the syringe is fixedly connected to the sliding block; the piston of the syringe extends above the sliding block; the sliding block is provided with the piston driving motor; the piston driving motor can drive a piston driving lead screw connected with an upper end of the piston to rotate so that the piston rises and falls in the syringe to absorb or extrude liquid in the syringe; the laser range finder is arranged beside the sliding block; the reflecting plate is arranged beside the upper end of the piston which is aligned with the laser range finder; and the reflecting plate can cooperate with the laser range finder to measure the position and the movement distance of the piston in the syringe.

2. The intelligent chamber for electrochemical sensing and detection according to claim 1, wherein a deflection driving motor is arranged at a side of the electrode holder; the deflection driving motor is connected with the electrode holder through a rotating shaft; the deflection driving motor can drive the electrode holder to deflect by a certain angle through the rotating shaft; a glass tube is arranged above the electrode holder; a dry airflow is introduced into the glass tube; and an air outlet of the glass tube is aligned with an electrode held by the electrode holder so that the dry airflow blown out of the glass tube can air-dry the electrode.

3. The intelligent chamber for electrochemical sensing and detection according to claim 1, wherein a bedplate is arranged in the chamber body; the transverse track is arranged at a rear end of an upper end surface of the bedplate; a tray is arranged above an upper end surface of a front of the bedplate at one side of the transverse track; the rotating driving component is arranged on the bedplate below the tray; the grooved container is arranged on the upper end surface of the front of the bedplate at the other side of the transverse track; the gas detection unit is arranged on the upper end surface of the bedplate at a front end of the grooved container; the temperature monitoring unit is arranged on the bedplate at side of the grooved container; and the temperature monitoring unit comprises two cooling fins respectively arranged on the upper end surface and a lower end surface of the bedplate correspondingly and a semiconductor chilling plate located between the two cooling fins.

* * * * *